US011249659B2

(12) United States Patent
Dutta et al.

(10) Patent No.: US 11,249,659 B2
(45) Date of Patent: Feb. 15, 2022

(54) OPERATIONAL METRIC COMPUTATION FOR WORKLOAD TYPE

(71) Applicant: Hewlett Packard Enterprise Development LP, Houston, TX (US)

(72) Inventors: Mayukh Dutta, Bangalore Karnataka (IN); Manoj Srivatsav, Bangalore Karnataka (IN); Soumen Shekhar Das, Bangalore Karnataka (IN); Gautham Parameshwar Hegde, Bangalore Karnataka (IN); Sivasakthi Thirugnanapandi, Bangalore Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/861,511

(22) Filed: Apr. 29, 2020

(65) Prior Publication Data

US 2020/0393981 A1   Dec. 17, 2020

(30) Foreign Application Priority Data

Jun. 17, 2019 (IN) .............................. 201941024014

(51) Int. Cl.
*G06F 3/06* (2006.01)
*G06F 9/50* (2006.01)
*G06K 9/62* (2006.01)

(52) U.S. Cl.
CPC .......... *G06F 3/0631* (2013.01); *G06F 3/0604* (2013.01); *G06F 3/067* (2013.01);
(Continued)

(58) Field of Classification Search
CPC .... G06F 3/0631; G06F 9/5011; G06K 9/6256
See application file for complete search history.

(56) References Cited

U.S. PATENT DOCUMENTS 8,578,023 B2 * 11/2013 Satterfield .............. G06Q 10/06
709/224
8,856,335 B1 * 10/2014 Yadwadkar ............. G06F 9/465
709/226

(Continued)

FOREIGN PATENT DOCUMENTS

WO   2017/105376 A1   6/2017

OTHER PUBLICATIONS

Basit Raza, "Self-Prediction of Performance Metrics for DBMS Workload", 42-FBAS/PhDCS/F08, Feb. 2014, 164 pages.
(Continued)

*Primary Examiner* — David E Martinez
(74) *Attorney, Agent, or Firm* — Hewlett Packard Enterprise Patent Department (57) ABSTRACT

In some examples, a system aggregates operational metric data of a plurality of storage volumes into aggregated operational metric data groups that correspond to different workload types of workloads for accessing data of a storage system. The system computes an operational metric for a first workload type of the different workload types, the operational metric relating to a resource of the storage system, where the computing of the operational metric for the first workload type comprises inputting aggregated operational metric data of a first aggregated operational metric data group of the aggregated operational metric data groups into a model trained at a system level of the storage system.

20 Claims, 5 Drawing Sheets (52) U.S. Cl.
CPC .......... *G06F 3/0653* (2013.01); *G06F 3/0683* (2013.01); *G06F 9/5011* (2013.01); *G06K 9/6256* (2013.01)

(56) References Cited

U.S. PATENT DOCUMENTS

| | | | |
|---|---|---|---|
| 9,703,664 B1* | 7/2017 | Alshawabkeh | .......... G06F 3/061 |
| 10,200,461 B2* | 2/2019 | Tino | ...................... G06F 9/5077 |
| 2017/0269854 A1* | 9/2017 | Dimnaku | .............. G06F 3/0613 |

OTHER PUBLICATIONS

Magalhaes, D.M.V, "Workload Modeling and Prediction for Resources Provisioning in Cloud", 2017, 102 pages.

Mozafari et al., "Performance and Resource Modeling in Highly-Concurrent OLTP Workloads", SIGMOD'13, ACM, Jun. 22-27, 2013, 13 Pages.

David E. Y. Sarna, "Forecasting computer resource utilization using key volume indicators," 1979 International Workshop on Managing Requirements Knowledge (MARK), 1979, pp. 185-192, doi: 10.1109/MARK.1979.8817112, <https://ieeexplore.ieee.org/stamp/stamp.isp?tp=&arnumber=8817112>.

\* cited by examiner

OPERATIONAL METRIC COMPUTATION FOR WORKLOAD TYPE

BACKGROUND

An arrangement of storage devices can be used to store data. In some examples, data storage by the arrangement of storage devices can be partitioned into storage volumes. A "storage volume" can refer to a logical unit of storage (e.g., a virtual volume having a virtual address range) to which storage locations in physical storage (e.g., storage device(s) in storage array(s), or portions thereof) may be allocated for storage of a collection of data, and that can be managed as a unit.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "storage system" can refer to a platform including hardware and machine-readable instructions to implement storage of data. A storage system can be implemented using a combination of processing resources, memory resources, and communication resources. A storage system can include or have access to a storage device (or multiple storage devices). A "storage device" can include persistent storage implemented using nonvolatile storage device(s), such as disk-based storage device(s) (e.g., hard disk drive(s) (HDD(s)), or the like), solid state storage device(s) (e.g., solid state drive(s) (SSD(s)), or the like), and so forth.

A processing resource can include a processor, multiple processors, or a portion (e.g., a core or multiple cores) of a processor. A memory resource can include a memory device or multiple memory devices, such as a dynamic random access memory (DRAM), a static random access memory (SRAM), and so forth. An example of a memory resource is a cache memory to temporarily store data that is held in a persistent storage. A communication resource can include a network interface controller (or a portion thereof) or a port that is used to communicate over a network. In further examples, a storage system can include other resources, including physical resources and/or virtual resources.

Storage system performance and/or usage can be expressed using a number of operational metrics. The operational metrics can include usage metrics, which represent usage of the storage system, and/or performance metrics, which represent how well the storage system is performing. Examples of operational metrics include any or some combination of the following: an input/output (I/O) count (that counts a number of I/O requests such as read and write requests), a ratio between read requests and write requests, a cache hit percentage (a percentage of requests that can be satisfied from a cache memory), processor usage, processor saturation (that indicates an amount of a processor that is consumed due to usage of the processor by workloads), cache saturation (that indicates an amount of a cache that is consumed due to usage of the cache by workloads), persistent storage saturation (that indicates an amount of a persistent storage that is consumed due to usage of the persistent storage by workloads), port saturation (that indicates a bandwidth of a port that is consumed due to usage of the port by workloads), queue depth (an amount of a queue storing data), a size of an I/O operation, a measure of a processor being busy, and so forth.

Operational metrics are based on workload patterns performed at a storage system (or multiple storage systems). A workload pattern refers to a collection of activities associated with accessing (read access and/or write access) of the storage system(s).

In some examples, workload patterns may be observed for respective storage volumes provided by the storage system(s). As described above, a storage volume is a logical unit of storage (e.g., a virtual volume having a virtual address range) to which storage locations in physical storage (e.g., storage device(s) in storage array(s), or portions thereof) may be allocated for storage of data. Storage volumes can be presented to host system(s) that can read and write data of the storage volumes. For example, a storage volume can be exported by a storage system to a host system, for use by the host system. More generally, a storage volume can be made available to the host system so that the host system can access data in the storage volume.

A "host system" can refer to a platform that includes hardware and machine-readable instructions and that is capable of issuing requests to access (read access and/or write access) data of storage volumes. For example, an application program (which is an example of machine-readable instructions) can run in a host system and issue read and write requests for data of storage volume(s).

A storage system stores data that may be accessed by a number of requesters (e.g., programs or other entities) that can be part of a host system, or multiple host systems. The requesters that may access data of the storage system may be dynamic, in terms of data access patterns (e.g., patterns relating to types of data requested, how frequently data is requested, etc.) of the requesters, or in terms of which requesters are accessing the storage system at any given time. As a result, the workloads experienced by the storage system may exhibit a heterogeneous workload pattern including changing data access patterns from different combinations of requesters at different times.

Additionally, workloads from different requesters as observed at the storage system are interleaved with one another. In other words, the input/output (I/O) operations (read operations and/or write operations) of workloads from multiple requesters can be processed at the storage system in an interleaved manner where some I/O operations for a first requester may be processed by the storage system in between I/O operations for a second requester. As a result, it can be difficult for a determination to be made regarding the impact of individual workloads on resources of the storage system. An "individual workload" (or more simply, a "workload") can refer to a collection of activities for a corresponding requester (e.g., a program, a host system, a request from a program or host system, etc.). Thus, different individual workloads can be due to activities of different requesters, or even due to different requests of one requester.

If a resource (e.g., a processing resource, a memory resource, and/or a communication resource) of a storage system is experiencing heavy usage such that overall performance of the resource or the storage system is suffering, it can be difficult for a human analyst or a machine or program to determine which workloads (e.g., which types of workloads) are causing the heavy usage of the resource.

In accordance with some implementations of the present disclosure, operational metric data of multiple storage volumes is aggregated into aggregated operational metric data groups that correspond to different workload types of workloads for accessing data of a storage system. "Operational metric data" can refer to measured or derived values of an operational metric or multiple operational metrics. An "aggregated operational metric data group" refers to aggregated metric values computed based on aggregating operational metric data of a respective collection of storage volumes. A first aggregated operational metric data group for a first collection of storage volumes corresponds to a first workload type of the different workload types of workloads, a second aggregated operational metric data group for a second collection of storage volumes corresponds to a second workload type of the different workload types of workloads, and so forth. As an example, each aggregated operational metric data group can include aggregated metric values at different intervals, such as time intervals, spatial intervals, and so forth.

After the operational metric data groups are computed, an operational metric for each respective workload type of the different workload types is computed, where the operational metric relates to a resource of the storage system. The computing of the operational metric for the respective workload type includes inputting aggregated operational metric data of the corresponding aggregated operational metric data group of the aggregated operational metric data groups into a model trained at a system level of the storage system. A model trained at the system level refers to a model trained using training data collected for the storage system without distinguishing the training data among different workload types. For example, values of an operational metric(s) can be measured or derived for the resource(s) of the storage system across all workloads performed at the storage system, and these operational metric values collected across all workloads can be used as part of training data for training the model at the system level.

By being able to use a model trained at the system level of the storage system, a more efficient way of determining operational metrics for different workload types can be achieved. By being able to use a model trained at the system level of the storage system, a special model that is based on training data that distinguishes between different workload types does not have to be created. Creating a model specifically trained to distinguish different workload types can add to the complexity of model creation. For example, developing training data for different workload types can be challenging and time consuming. By inputting aggregated operational metric data of a particular aggregated operational metric data group into the system-level trained model, the model is able to produce operational metric data that is for a workload type corresponding to the particular aggregated operational metric data group.

The aggregated operational metric data for each respective workload type is similar in "scale" to the overall system workload (since it is based on an aggregate of large number of operational metric data for storage volumes). As a result, the system-level model is likely to perform better since the system-level model is applied on operational metric data (the aggregated operational metric data) that is closer in scale to the system-level operational metric data the model was trained on.

An administrator or other entity (such as a machine or program) may be able to access the operational metrics computed for the different workload types, to quickly ascertain whether an issue (e.g., an overloaded resource, an under-performing resource, etc.) is present in the storage system that should be addressed. In further examples, the operational metrics for the different workload types computed using the model can be presented to an automated system to take automatic action in response to an issue that is identified based on the operational metrics.

Figure 1:
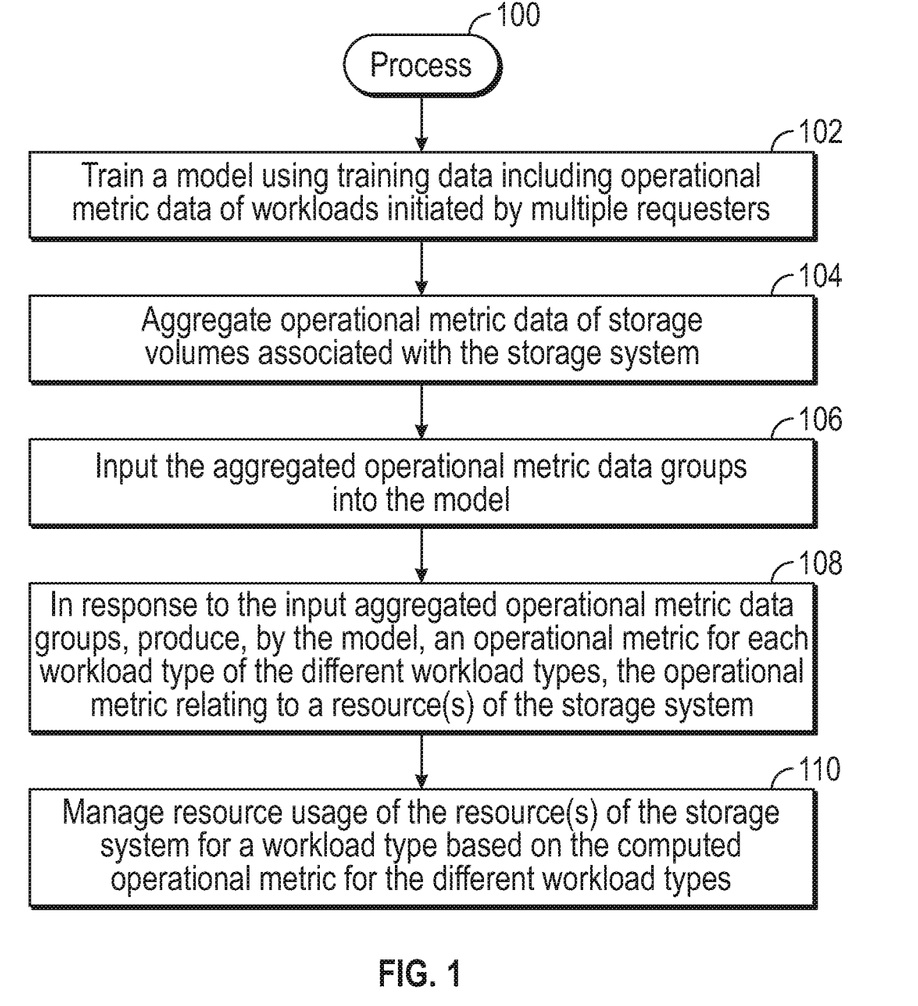
FIG. 1 is a flow diagram of a workload management process that includes computing an operational metric for a workload type, according to some examples.

FIG. 1 is a flow diagram of a process 100 according to some implementations of the present disclosure. The process 100 can be performed by a computing system, which can include a computer or multiple computers.

The process 100 includes training (at 102) a model (a machine learning model such as a regression model or another type of model) using training data including operational metric data of workloads initiated by multiple requesters. The workloads include data accesses (read accesses and/or write accesses) in a storage system. In some examples, the training data used to train the model includes operational metric data at a system level of the storage system. The operational metric data at the system level in the training data does not distinguish between different workload types.

A "machine learning model" can refer to a model that can be adjusted as further training data is provided to train the model. The adjustment of the model based on training data is also referred to as learning the model. A regression model is a model that relates multiple variables of interest, where the variables can include an output variable(s) such as an operational metric(s) relating to a performance or usage of a resource of the storage system, and an input variable(s), such as operational metric data collected at a host system or multiple host systems. Training a model using training data can use any of various different machine learning techniques.

Although reference is made to "storage system" in the singular sense in the process 100, it is noted that the process 100 is applicable to a context that includes multiple storage systems.

The process 100 further includes aggregating (at 104) operational metric data of storage volumes associated with the storage system. The aggregating aggregates the operational metric data into aggregated operational metric data groups that correspond to different workload types. "Aggregating" an operational metric can refer to calculating a value based on combining values of the operational metric. For example, aggregating the operational metric can refer to any or some combination of the following: summing the values of the operational metric, averaging the values of the operational metric, computing a median of the values of the operational metric, computing a maximum or minimum of the values of the operational metric, or applying any other type of mathematical computation on the values of the operational metric.

Aggregating an operational metric into an aggregated operational metric data group refers to aggregating values of the operational metric associated with a respective collection of storage volumes. A "collection of storage volumes" can refer to a collection that includes a single storage volume, or multiple storage volumes. Different aggregated operational metric data groups are associated with different collections of storage volumes.

In some examples, the aggregated operational metric data groups can include a first group of aggregated operational metric data for a first collection of storage volumes accessed by a first requester, a second group of aggregated operational metric data for a second collection of storage volumes accessed by a second requester, and so forth.

In further examples, the aggregated operational metric data groups include a first group of aggregated operational metric data for a first collection of storage volumes storing compressed data, and a second group of aggregated operational metric data for a second collection of storage volumes storing uncompressed data.

In yet further examples, the aggregated operational metric data groups include a first group of aggregated operational metric data for a first collection of storage volumes grouped based on workload fingerprints assigned to storage volumes across a plurality of points (e.g., time points and/or spatial points), a second group of aggregated operational metric data for a second collection of storage volumes grouped based on the workload fingerprints assigned to storage volumes across the plurality of points, and so forth. Workload fingerprints are discussed further below.

Generally, the different collections of storage volumes can represent different workload types. Each collection of storage volumes "represents" a workload type in the sense that workload(s) performed with respect to the collection of storage volumes share a characteristic. According to the foregoing examples, a shared characteristic can be a requester that submitted requests producing the workload, or whether data stored by the collection of storage volumes is compressed or not, or a shared workload fingerprint.

For example, the first collection of storage volumes accessed by the first requester can represent a first workload type, and the second collection of storage volumes accessed by the second requester can represent a second workload type. As another example, the first collection of storage volumes storing compressed data can represent a first workload type, and the second collection of storage volumes storing uncompressed data can represent a second workload type. As yet a further example, the first collection of storage volumes grouped based on the workload fingerprints can represent a first workload type, and the second collection of storage volumes grouped based on the workload fingerprints can represent a second workload type.

The process 100 further includes inputting (at 106) the aggregated operational metric data groups into the model.

In response to the input aggregated operational metric data groups, the model produces (at 108) an operational metric for each workload type of the different workload types, the operational metric relating to a resource(s) of the storage system. For example, in response to aggregated operational metric values of a first aggregated operational metric data group input into the model, the model produces an operational metric for a first workload type. The operational metric can include any one or some combination of the operational metrics listed further above, as examples.

The process 100 further includes managing (at 110) resource usage of the resource(s) of the storage system for a workload type based on the computed operational metric for the different workload types.

Managing resource usage of a given resource for a given workload type can include any or some combination of the following: throttling usage of the given resource by the workloads of the given workload type (such as by reducing a rate at which data requests are submitted to a storage system for data of a collection of storage volumes corresponding to the given workload type); configuring a quality of service (QoS) setting for the workloads of the given workload type, where the QoS setting can affect a priority of the workloads of the given workload type in usage of the given resource; changing an allocation of the given resource to the workloads of the given workload type (such as by changing an amount of the resource allocated to handle data accesses of the data by workloads of the given workload type); migrating data of the workloads of the given workload type from a first set of storage devices to a different second set of storage devices; and so forth.

Figure 2:
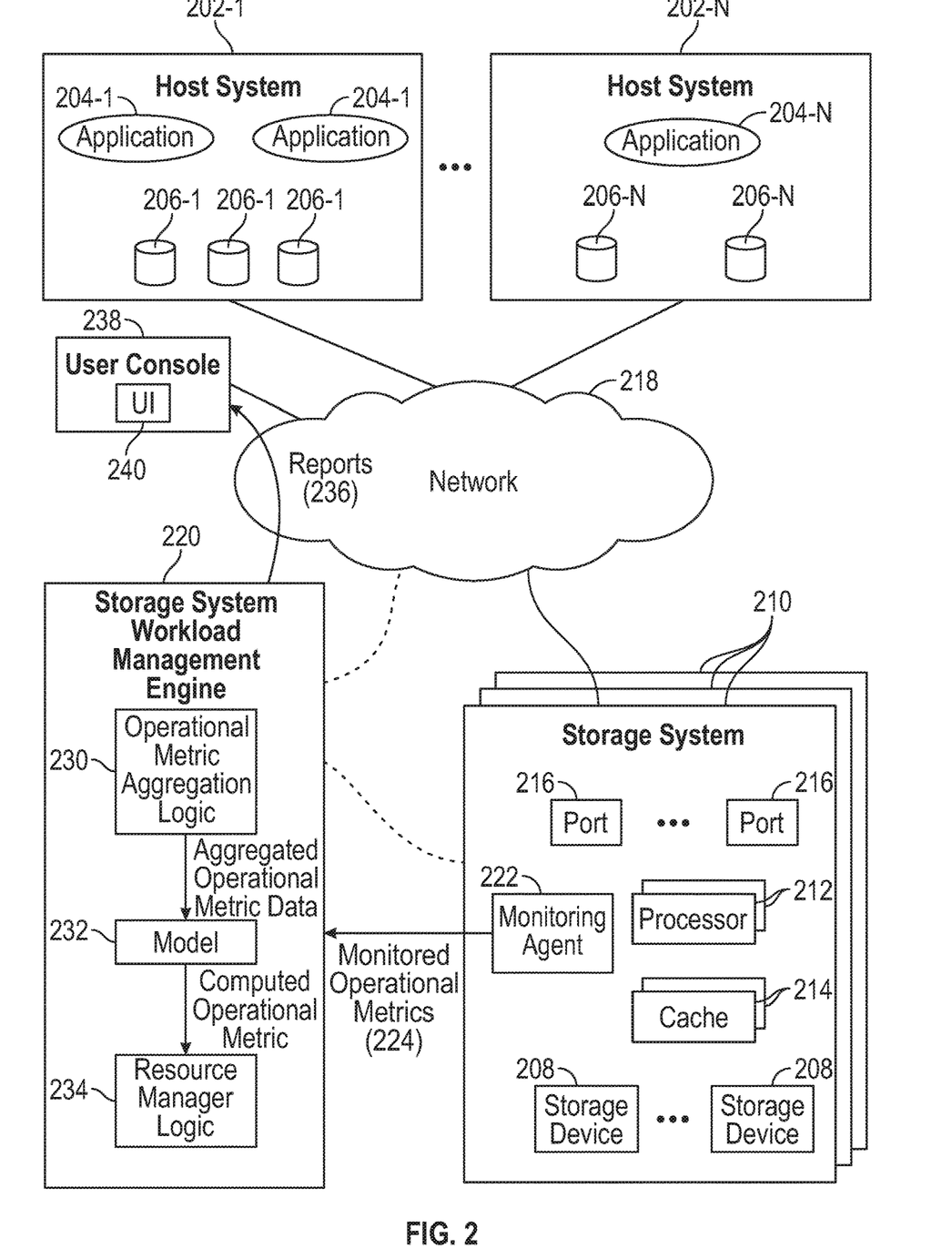
FIG. 2 is a block diagram of an arrangement that includes host systems, storage systems, and a storage system workload management engine, according to some examples.

FIG. 2 is a block diagram of an example arrangement that includes a number of host systems 202-1 to 202-N, where N≥1. Although multiple host systems are depicted in FIG. 2, it is noted that in other examples, just one host system may be present.

The host system 202-1 includes application programs 204-1 and storage volumes 206-1 that are presented to the host system 202-1. The host system 202-N includes an application program 204-N and storage volumes 206-N that are presented to the host system 202-N. Although examples according to FIG. 2 show application programs as examples of requesters that can access storage volumes, it is noted that in other examples, different types of requesters can access storage volumes.

As discussed above, the storage volumes 206-1 and 206-N are logical entities that are useable by requesters in the host systems 202-1 to 202-N. The underlying data that can be accessed using the storage volumes are stored by storage devices 208 of a storage system 210 (or multiple storage systems 210). The storage devices 208 can be implemented using disk-based storage devices, solid state memory devices, and/or other types of persistent storage devices. The storage devices 208 can be arranged as an array (or multiple arrays) of storage devices.

Although FIG. 2 shows the storage devices 208 as being part of the storage system 210, in other examples, the storage devices 208 may be external of but accessible by the storage system 210.

The storage system 210 includes processors 212 and cache memories 214. The processors 212 can execute a data access program (in the form of machine-readable instructions) that manage access of data stored in the storage devices 208 in response to requests received from a requester based on access of a storage volume (or multiple storage volumes) by the requester. A cache memory 214 can be used to temporarily store data, such as write data to be written to the storage devices 208.

The storage system 210 further includes various ports 216. A "port" can refer to a communication interface through which a host system 202-$i$ (i=1 to N) is able to access the storage system 210 over a network 218. Examples of the network 218 can include any or some combination of the following: a storage area network (SAN), a local area network (LAN), a public network such as the Internet, and so forth.

Each port 216 has a corresponding bandwidth that can be used to communicate data in response to access requests from requesters. A port can refer to a physical port or a logical port.

Although not shown, the host systems 202-1 and 202-N can each also include ports for communication over the network 218.

The ports 216, the processors 210, and the cache memories 212 are examples of resources of the storage system 210 that can be used to perform tasks associated with access of storage volumes (in workloads) by respective requesters.

The ports 216 are examples of communication resources. The processors 210 are examples of processing resources. The cache memories 212 are examples of memory resources.

FIG. 2 also shows a storage system workload management engine 220, which can perform a storage system workload management process, such as the process 100 shown in FIG. 1.

As used here, an "engine" or can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The storage system workload management engine 220 can be part of the storage system 210, or alternatively, can be separate from the storage system 210 and coupled to the network 218. A monitoring agent 222 (implemented using hardware or a combination of hardware and machine-readable instructions) can run in the storage system 210 to collect various operational metrics of the storage system 210.

Storage volumes can be identified by respective unique identifiers, and I/O requests that are targeted to a storage volume are tracked by tracking entities that can execute in the host systems 202-1 to 202-N. The tracked I/O requests and associated characteristics of the I/O requests (e.g., an I/O count of a number of I/O requests, a ratio of read requests to write requests, an I/O size, a rate of I/O requests, etc.) can be associated with the respective unique identifiers of the storage volumes to which the I/O requests are targeted. As a result, the monitoring agent 222 can determine operational metrics for each individual storage volume that are tracked using the unique identifiers of the storage volumes.

The monitoring agent 222 can transmit collected values of operational metrics 224 to the storage system workload management engine 220.

The storage system workload management engine 220 includes an operational metric aggregation logic 230, which aggregates values of an operational metric (which can refer to a single operational metric or multiple operational metrics) of multiple storage volumes into aggregated operational metric data groups that correspond to different workload types of workloads for accessing data of the storage system 210. The aggregated operational metric data that is part of the aggregated operational metric data groups is provided as an input to a model 232 that is trained at a first scale (e.g., a system level of the storage system 210) that is different from a workload type scale. A model trained on the workload type scale is based on training data that distinguishes between workload types. A model trained on the first scale does not consider training data that is based on different workload types.

Based on the input aggregated operational metric data groups, the model 232 computes an operational metric for each workload type of the different workload types. The computed operational metric relates to a resource (which can refer to a single resource or multiple resources) of the storage system 210. For example, the resource can include a processing resource, a memory resource, and/or a communication resource, as examples. The computed operational metric for each workload type of the different workload types is provided to a resource management logic 234, which can perform resource management of a resource of the storage system 210. The managed resource can include a processing resource, a memory resource, and/or a communication resource, as examples.

Each of the operational metric aggregation logic 230 or the resource management logic 234 can be implemented using a portion of the hardware processing circuit of the storage system workload management engine 220, or alternatively, can include machine-readable instructions executable by the hardware processing circuit of the storage system workload management engine 220.

In other examples, the operational metric aggregation logic 230 and/or the resource management logic 234 can be separate from the storage system workload management engine 220.

The model 232 can be stored in a persistent storage (not shown) that may be part of the storage system workload management engine 220, or that may be part of the storage system 210. The model 232 may be trained by the storage system workload management engine 220 using training data, or alternatively, a model 232 may be trained by a separate system and after training, the model 232 is provided to the storage system workload management engine 220.

The computed operational metrics produced by the model 232 can additionally or alternatively be provided in reports 236 (or other information) transmitted to a user console 238 over the network 218. A user console can refer to an electronic device, such as a desktop computer, a notebook computer, a tablet computer, a smartphone, and so forth. The user console 238 can display a user interface (UI) 240, which can present information of a report from the storage system workload management engine 220 to a user of the user console 238. Although FIG. 2 shows an example in which the storage system workload management engine 220 sends reports 236 to one user console 238, in other examples, the storage system workload management engine 220 can send reports 236 to multiple user consoles.

Figure 3:
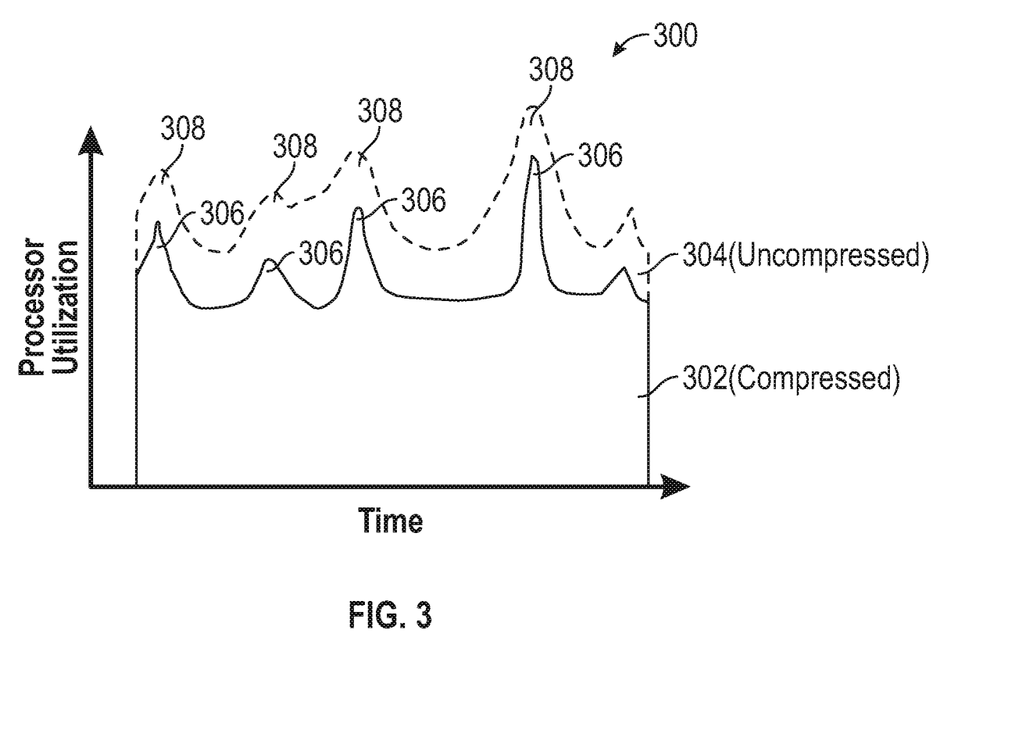
FIGS. 3 and 4 are plots of values of operational metrics over time for different workload types, according to some examples.

FIG. 3 is a plot 300 that correlates processor utilization (vertical axis of the plot) to time (horizontal axis of the plot 300). The processor utilization shown in FIG. 3 is an example of an operational metric that is computed using the model 232 of FIG. 2. The plot 300 may be displayed in the UI 240 of the user console 238 of FIG. 2, or may be provided to the resource management logic 234 of FIG. 2.

In the example of FIG. 3, it is assumed that a first group of aggregated operational metric data is created by aggregating operational metric data for a first collection of storage volumes that stores compressed data, and a second group of aggregated operational metric data is created by aggregating operational metric data for a second collection of storage volumes that store uncompressed data. In the plot 300, a first graph portion 302 represents the processor utilization for the first collection of storage volumes that stores compressed data, and a second graph portion 304 represents processor utilization for the second collection of storage volumes that stores uncompressed data.

As can be observed in the example plot 300, spikes 306 (of the first graph portion 302) in processor utilization are due to data access of the first collection of storage volumes that store compressed data. Note that the spikes 308 (of the second graph portion 304) in processor utilization for the second collection of storage volumes that store uncompressed data generally follow the shape of the spikes 306 of the first graph portion 302, so that it can be readily determined that the spikes 308 of the second graph portion 304 are due to the spikes 306 of the first graph portion 302.

Thus, action can be taken to address an issue related to storage volumes that store compressed data, such as by throttling usage of processors 210 to storage volumes that store compressed data, or increasing a QoS setting for storage volumes that store compressed data.

Figure 4:
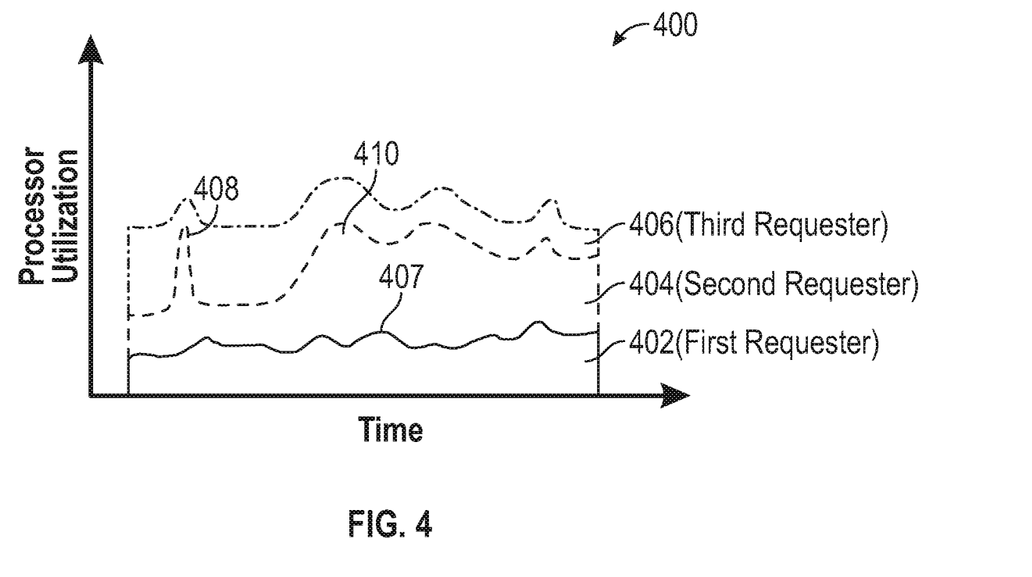

FIG. 4 is a plot 400 that shows a different example that relates processor utilization to time. The plot 400 may be generated by the storage system workload management engine 220 of FIG. 2 and displayed in the UI 240 of the user console 238 of FIG. 2, or may be provided to the resource management logic 234 of FIG. 2.

The different graph portions 402, 404, and 406 of the plot 400 represent processor utilizations of respective different collections of storage volumes accessed by different requesters. For example, a first graph portion 402 represents processor utilization by a first requester of a first collection of storage volumes, a second graph portion 404 represents processor utilization by a second requester of a second collection of storage volumes, and a third graph portion 406 represents processor utilization by a third requester of a third collection of storage volumes.

As can be seen based on a comparison of the first graph portion 402 and the second graph portion 404, the processor utilization due to workloads from the first requester is relatively steady with small variations represented by the curve 407. However, the second graph portion 402 includes parts 408 and 410 that indicate a large rise in processor utilization due to workloads from the second requester. Thus, it can be readily determined that workloads of the second requester are driving relatively large increases in processor utilization at the storage system.

Examples of actions that can be taken include throttling usage of processors 210 for storage volumes accessed by the second requester, or increasing a QoS setting for storage volumes accessed by the second requester.

A plot similar to the plot 300 or the plot 400 can be provided to correlate processor utilization to time for multiple collections of storage volumes that have been clustered using workload fingerprints.

A "workload fingerprint" can refer to any representation of a type of a workload, and is assigned based on a sample of operational metrics collected at a given point (e.g., time point, spatial point, etc.) in association with access of data of a storage volume. Based on the collections of workload fingerprints assigned to respective storage volumes, the storage system workload management engine 220 groups the storage volumes into clusters of storage volumes. For example, a first storage volume and a second storage volume are grouped into a given cluster based on a first collection of workload fingerprints assigned to the first storage volume, and a second collection of workload fingerprints assigned to the second storage volume. The grouping of storage volumes into clusters can use any of various clustering techniques.

Figure 5:
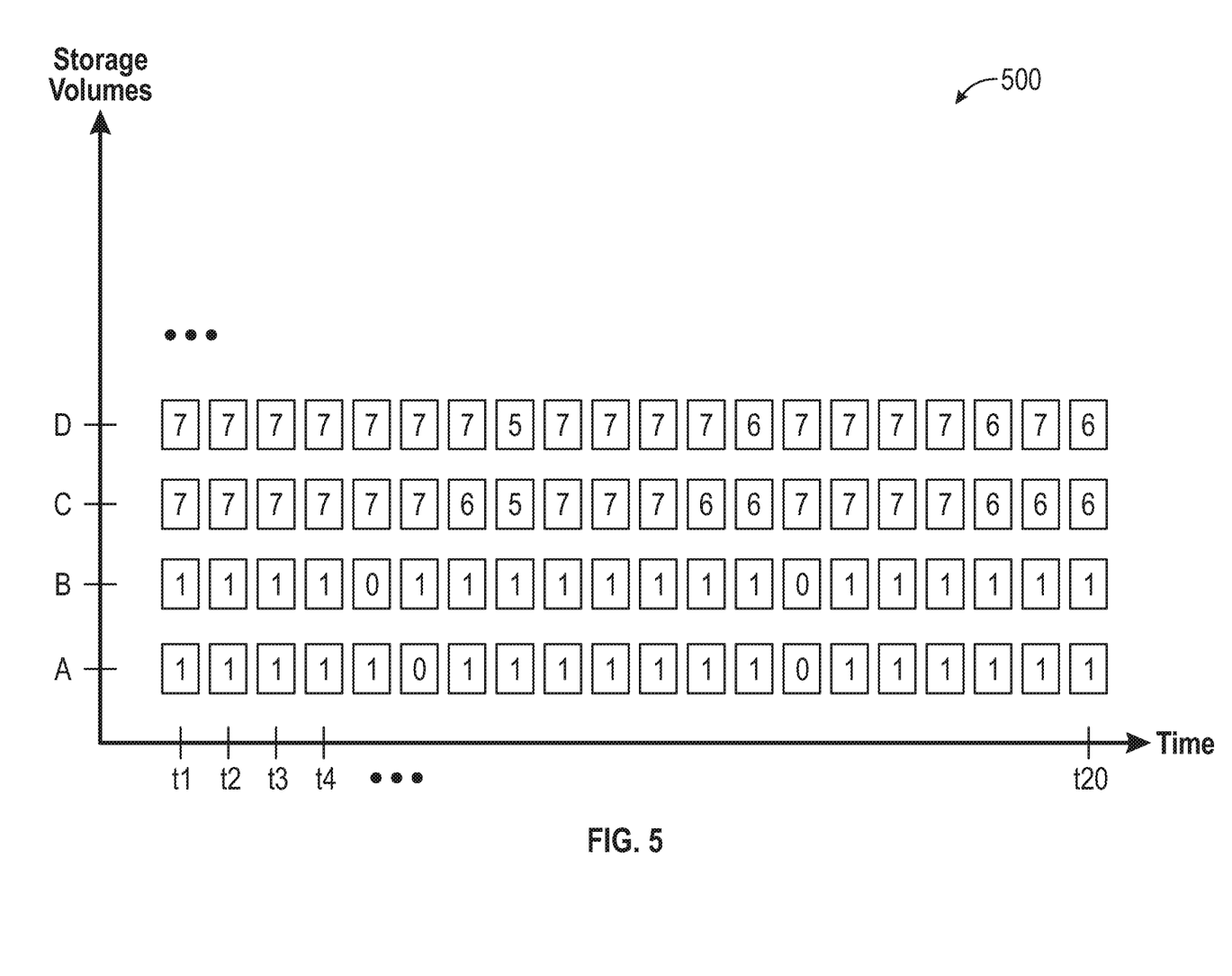
FIG. 5 is a plot that shows workload fingerprints for different storage volumes, according to further examples.

FIG. 5 shows a plot 500 that can be generated by the storage system workload management engine 220. In the example plot 500, the horizontal axis represents time, and the vertical axis represents different storage volumes (storage volumes A, B, C, and D shown in FIG. 5). For each storage volume, respective workload fingerprints are assigned based on a collection of operational metrics collected at corresponding time points along the time axis.

According to FIG. 5, each row of workload fingerprints makes up a vector of workload fingerprints at multiple time points t1 to t20. Each workload fingerprint is in the form of a numeric value included in a cell (a rectangular block) of the plot 500. For example, there can be some number (e.g., 8 or some other number) of workload fingerprints, and a workload fingerprint can be selected from among the number workload fingerprints to assign to a storage volume at a given time point. The workload fingerprint selected is based on values of a collection of operational metrics at the given time point.

As the operational metrics change in values over time, the workload fingerprints assigned to a storage volume can change accordingly. For example, for storage volume A, the vector of workload fingerprints includes a sequence of "1" and "0" values. Similarly, for storage volume B, the vector of workload fingerprints includes a sequence of "1" and "0" values. For each of storage volumes C and D, the respective vector of workload fingerprints includes a sequence of "7", "6", and "5" values.

In some examples, the workload fingerprints can be created using an unsupervised machine learning technique performed across operational metrics collected from storage systems that are deployed at various sites. Alternatively, the workload fingerprints may be pre-assigned, such as by a user or another entity.

The total time interval over which the vector of workload fingerprints for each storage volume is collected can be specified by an entity, such as a user, a machine, or a program. The total time interval can be 24 hours or a different total time interval, for example.

Storage volumes can be considered similar to one another if their assigned vectors of workload fingerprints share some specified similarity with respect to one another. In some examples, the storage system workload management engine 220 can use an unsupervised machine learning technique for clustering the storage volumes based on their respective vectors of workload fingerprints. For example, a density-based spatial clustering of applications with noise (DBSCAN) data clustering technique can be employed for clustering the storage volumes based on the respective vectors of workload fingerprints. Given a set of points in a space (which in this case includes vectors of workload fingerprints), the DBSCAN technique groups together the workload fingerprint vectors that are closely packed together.

In other examples, other clustering techniques can be employed, such as an affinity propagation clustering technique, or a different clustering technique.

In the example of FIG. 5, the similarity of the workload fingerprint vectors for storage volumes A and B would cause the clustering technique to group storage volumes A and B into a first cluster, and the similarity of the workload fingerprint vectors for storage volumes C and D would cause the clustering technique to group storage volumes C and D into a second cluster.

Each cluster of storage volumes identified using the workload fingerprint technique can be considered a collection of storage volumes that corresponds to a respective workload type.

Figure 6:
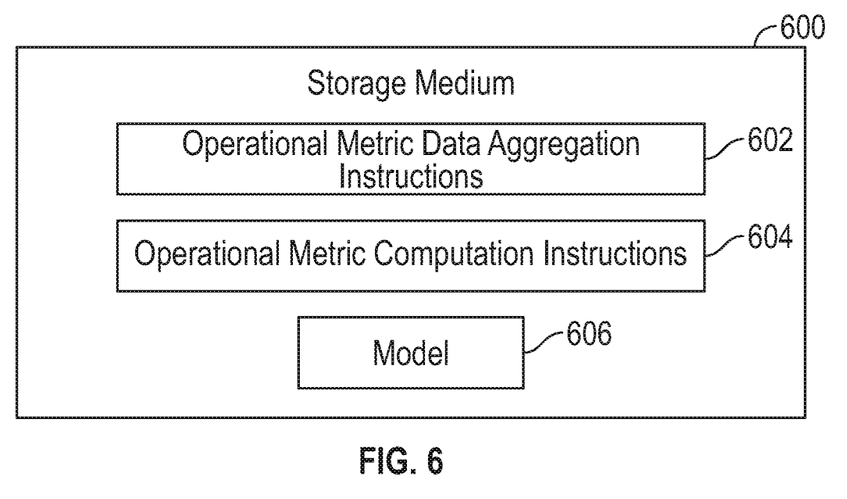
FIG. 6 is a block diagram of a storage medium storing machine-readable instructions according to some examples.

FIG. 6 is a block diagram of a non-transitory machine-readable or computer-readable storage medium 600 storing machine-readable instructions that upon execution cause a computing system to perform various tasks.

The machine-readable instructions include operational metric data aggregation instructions 602 to aggregate operational metric data of multiple storage volumes into aggregated operational metric data groups that correspond to different workload types of workloads for accessing data of a storage system.

The machine-readable instructions further include operational metric computation instructions 604 to compute an operational metric for a respective workload type of the different workload types, the operational metric relating to a resource of the storage system. The computing of the operational metric for the respective workload type includes inputting aggregated operational metric data of a respective aggregated operational metric data group into a model 606 trained at a system level of the storage system. The model is trained at a storage system scale different from a workload type scale, where the model trained at the storage system scale uses training data that does not distinguish between different workload types.

In some examples, the model 606 can include a regression model or a different type of model.

The computed operational metric relates to any or some combination a processing resource of the storage system, a memory resource of the storage system, or a communication resource of the storage system.

In some examples, the machine-readable instructions can present, in a user interface (such as the UI 240 of FIG. 2), a representation of computed operational metrics (such as in the form of the plot 300 or 400 of FIG. 3 or 4) including the computed operational metric for the first workload type.

Figure 7:
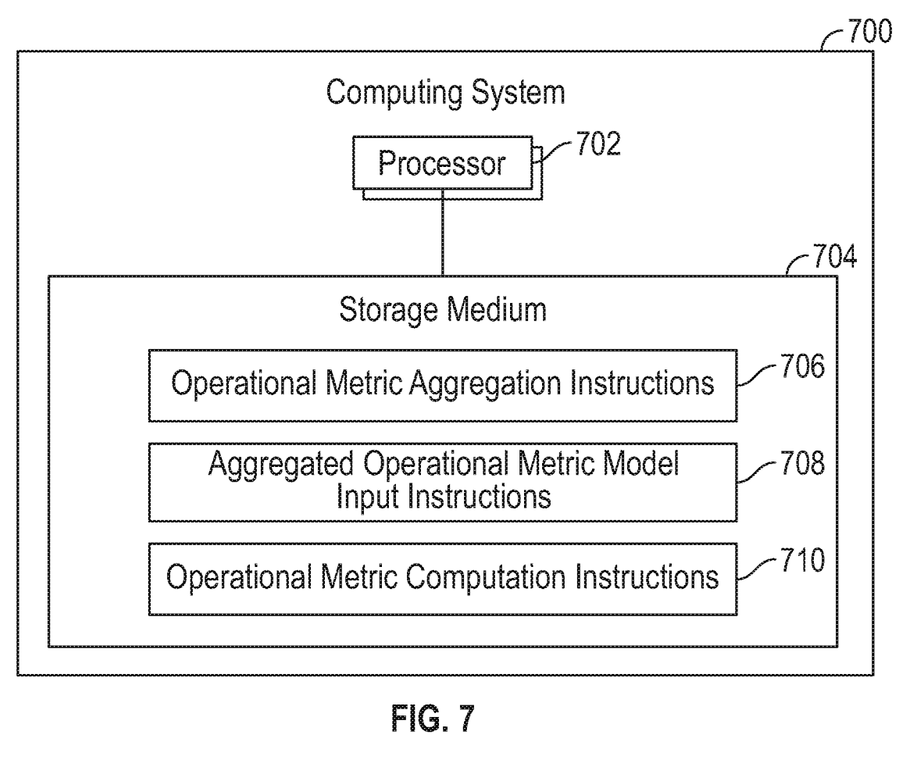
FIG. 7 is a block diagram of a computing system according to some examples.

FIG. 7 is a block diagram of a computing system 700, which can be implemented as a computer or a collection of computers. The computing system 700 includes a hardware processor 702 (or multiple hardware processors). A hardware processor can include a microprocessor, a core of a multi-core microprocessor, a microcontroller, a programmable integrated circuit, a programmable gate array, a digital signal processor, or another hardware processing circuit.

The computing system 700 further includes a storage medium 704 storing machine-readable instructions executable on the hardware processor 702 to perform various tasks. Machine-readable instructions executable on a hardware processor can refer to the instructions executable on a single hardware processor or the instructions executable on multiple hardware processors.

The machine-readable instructions include operational metric aggregation instructions 706 to aggregate operational metric data of multiple storage volumes into aggregated operational metric data groups that correspond to different workload types of workloads for accessing data of a storage system.

The machine-readable instructions further include aggregated operational metric model input instructions 708 to input the aggregated operational metric data groups into a model trained at a first scale different from a workload type scale.

The machine-readable instructions further include operational metric computation instructions 710 to compute, based on the input of the aggregated operational metric data groups into the model, an operational metric for each workload type of the different workload types, the operational metric relating to a resource of the storage system.

A storage medium (e.g., 600 in FIG. 6 or 704 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium; or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause at least one processor to:
   aggregate operational metric data of a plurality of storage volumes into aggregated operational metric data groups that correspond to different workload types of workloads for accessing data of a storage system; and
   compute an operational metric for a first workload type of the different workload types, the operational metric relating to a resource of the storage system, wherein the computing of the operational metric for the first workload type comprises inputting aggregated operational metric data of a first aggregated operational metric data group of the aggregated operational metric data groups into a model trained at a system level of the storage system.

2. The non-transitory machine-readable storage medium of claim 1, wherein the model is trained at a storage system scale different from a workload type scale.

3. The non-transitory machine-readable storage medium of claim 2, wherein the model trained at the storage system scale uses training data that does not distinguish between different workload types.

4. The non-transitory machine-readable storage medium of claim 1, wherein the instructions upon execution cause at least one processor to:
   compute the operational metric for a second workload type of the different workload types, by inputting aggregated operational metric data of a second aggregated operational metric data group of the aggregated operational metric data groups into the model.

5. The non-transitory machine-readable storage medium of claim 1, wherein the computed operational metric relates to at least one of a processing resource of the storage system, a memory resource of the storage system, or a communication resource of the storage system.

6. The non-transitory machine-readable storage medium of claim 1, wherein the aggregated operational metric data groups comprise a first group of aggregated operational metric data for a first collection of storage volumes accessed by a first requester, and a second group of aggregated operational metric data for a second collection of storage volumes accessed a second requester.

7. The non-transitory machine-readable storage medium of claim 1, wherein the aggregated operational metric data groups comprise a first group of aggregated operational metric data for a first collection of storage volumes storing compressed data, and a second group of aggregated operational metric data for a second collection of storage volumes storing uncompressed data.

8. The non-transitory machine-readable storage medium of claim 1, wherein the aggregated operational metric data groups comprise a first group of aggregated operational metric data for a first collection of storage volumes grouped based on workload fingerprints assigned to storage volumes across a plurality of points, and a second group of aggregated operational metric data for a second collection of storage volumes grouped based on the workload fingerprints assigned to storage volumes across the plurality of points.

9. The non-transitory machine-readable storage medium of claim 8, wherein a workload fingerprint is assigned to a storage volume based on operational metrics associated with access of data in the storage volume.

10. The non-transitory machine-readable storage medium of claim 1, wherein the instructions upon execution cause at least one processor to:
manage resource usage of the resource of the storage system for the first workload type based on the computed operational metric.

11. The non-transitory machine-readable storage medium of claim 10, wherein the managing of the resource usage is performed for a first collection of storage volumes corresponding to the first workload type.

12. The non-transitory machine-readable storage medium of claim 1, wherein the instructions upon execution cause at least one processor to:
present, in a user interface, a representation of computed operational metrics including the computed operational metric for the first workload type.

13. A computing system comprising:
a processor; and
a non-transitory storage medium storing instructions executable on the processor to:
aggregate operational metric data of a plurality of storage volumes into aggregated operational metric data groups that correspond to different workload types of workloads for accessing data of a storage system;
input the aggregated operational metric data groups into a model trained at a first scale different from a workload type scale; and
compute, based on the input of the aggregated operational metric data groups into the model, an operational metric for each workload type of the different workload types, the operational metric relating to a resource of the storage system.

14. The computing system of claim 13, wherein the model comprises a regression model.

15. The computing system of claim 13, wherein the instructions are executable on the processor to:
manage resource usage of the resource of the storage system for a first workload type of the different workload types based on the computed operational metric for the first workload type.

16. The computing system of claim 13, wherein the aggregated operational metric data groups comprise a first group of aggregated operational metric data for a first collection of storage volumes accessed by a first requester, and a second group of aggregated operational metric data for a second collection of storage volumes accessed a second requester.

17. The computing system of claim 13, wherein the aggregated operational metric data groups comprise a first group of aggregated operational metric data for a first collection of storage volumes storing compressed data, and a second group of aggregated operational metric data for a second collection of storage volumes storing uncompressed data.

18. The computing system of claim 13, wherein the aggregated operational metric data groups comprise a first group of aggregated operational metric data for a first collection of storage volumes grouped based on workload fingerprints assigned to storage volumes across a plurality of points, and a second group of aggregated operational metric data for a second collection of storage volumes grouped based on the workload fingerprints assigned to storage volumes across the plurality of points.

19. A method performed by a system comprising a hardware processor, comprising:
training a model using training data comprising operational metric data of workloads initiated by a plurality of requesters, the workloads comprising data access of a storage system, and the training data does not distinguish between different workload types;
aggregate operational metric data of a plurality of storage volumes into aggregated operational metric data groups that correspond to different workload types of workloads;
inputting the aggregated operational metric data groups into the model;
producing, by the model, an operational metric for each workload type of the different workload types, the operational metric relating to a resource of the storage system; and
managing resource usage of the resource of the storage system for a workload type based on the computed operational metric for the different workload types.

20. The method of claim 19, wherein a first aggregated operational metric data group for a first collection of volumes corresponds to a first workload type of the different workload types of workloads, and a second aggregated operational metric data group for a second collection of volumes corresponds to a second workload type of the different workload types of workloads.

* * * * *